United States Patent [19]

Peppler et al.

[11] 3,970,044

[45] July 20, 1976

[54] CONTROLLED FEEDING OF LIVESTOCK

[75] Inventors: William S. Peppler, New York, N.Y.; Everett M. Keen; Anthony J. Siciliano, both of Vineland, N.J.

[73] Assignee: Diamond International Corporation, New York, N.Y.

[22] Filed: Aug. 29, 1974

[21] Appl. No.: 501,835

[52] U.S. Cl. ............................... 119/18; 119/52 B
[51] Int. Cl.² ........................................... A01K 5/02
[58] Field of Search ............... 119/18, 22, 48, 51 R, 119/52 R, 52 B

[56] References Cited
UNITED STATES PATENTS

| | | | |
|---|---|---|---|
| 2,314,344 | 3/1943 | Cornell | 119/18 |
| 2,339,043 | 1/1944 | Armstrong | 119/18 |
| 3,698,361 | 10/1972 | Lecce | 119/52 B |
| 3,727,582 | 4/1973 | Heying et al | 119/18 |
| 3,776,194 | 12/1973 | Conley | 119/52 B |

*Primary Examiner*—J.N. Eskovitz
*Attorney, Agent, or Firm*—Karl W. Flocks

[57] ABSTRACT

A method of controlling feed ingredients and quantity consumed by livestock including the steps of confining the livestock in an area, segregating the livestock into two or more groups, providing each of the segregated groups of livestock with its own individual feed receptacle, dispensing accurately measured uniform quantities of feed into each receptacle at numerous intervals each day. In the case of poultry, for example, groups of five chickens each may be confined in a cage with a feed receptacle that is on the order of 15 inches in length provided therefor. Feed may be dispensed into each receptacle on the order of about 4 to 20 times each day. For groups of five chickens fed 16 times a day, for example, the quantity of feed dispensed into each receptacle at each feeding interval may be about one ounce per 15 inches or five chickens.

10 Claims, 4 Drawing Figures

CONTROLLED FEEDING OF LIVESTOCK

BACKGROUND OF THE INVENTION

1. Field of the Invention

The present invention relates to a method of feeding livestock and in particular in the feeding of poultry raised commercially for human consumption, egg laying, or the like.

2. Description of the Prior Art

In the livestock producing industry it is common knowledge that feed is rarely uniform as to grade or ingredients. Numerous reasons account for the lack of uniformity in feed, among which are seasonal factors, differences in grades, ingredients, and supply sources. It is a recognized fact that livestock, like humans, should have a properly balanced diet, which would account for differences in feed ingredients. As the feed is made up of various ingredients, it frequently happens that the livestock prefer the taste of one or more ingredient over the taste of others and will pick out the more tasty ingredients and possibly suffer deficiencies by not eating some of the less tasty, but beneficial ingredients. Also, as the feed ingredients differ, the weight per volume of various feed will differ and a picky animal may consume more or less in weight of feed, particularly if it is more aggressive or faster in its eating habits than that of its mates.

Even in the case of poultry different types have different requirements. Examples of different types of poultry include broilers, breeders, and layers. In the case of broilers, that is poultry raised primarily for consumption of its meat and sold by weight, the conversion of feed to meat would effect significant monetary return for cost of feed. By contrast breeders, that is poultry kept primarily for breeding purposes and not for immediate sale for consumption, do not produce any monetary return for their increase in weight due to being amply fed. In the case of layers, it is known, for example, that eggs laid are as great or better when the feeding of the layers is restricted than when full feeding, that is, all that the layers can eat, is permitted. By way of example, it is noted that large eggs according to commercial grading must weigh 24 ounces per dozen or better and that as the layers age to beyond their peak production the eggs that are then laid are larger and weigh as much as 25 or 25½ ounces per dozen. The poultry farmer is paid the same amount for such larger eggs produced by older layers as he is paid for the slightly smaller eggs of younger layers and thus does not profit from the added weight of the larger eggs.

As feed does affect egg size and weight, the poultry farmer would profit from savings in feed cost by reducing the feed the older layers are permitted to consume at least to the point that the eggs produced by such older layers are closer to 24 ounces per dozen than 25 ounces per dozen.

Because of the desirability of restricting the amount of feed poultry are permitted to consume, various methods have been tried with an eye to reducing poultry feed consumption. One method of restricting the feeding of poultry is by covering the feed so that the poultry can eat only at given period during each day and not at other periods of the day. This method has not worked out with complete satisfaction as some birds eat faster and/or are more aggressive so that as long as the feed is uncovered some birds confined in the same general area, whether it be a pen or a cage, will consume more feed than others.

SUMMARY OF THE INVENTION

The present invention comprises a new or improved method of feeding livestock, and in particular poultry. Consistent with the method disclosed herein, it is an object of the present invention to provide a new and improved method of feeding livestock whereby the health of the livestock is improved.

It is also an object of the present invention to reduce the amount of feed consumed by livestock.

It is further an object of the present invention to reduce the amount of money expended for feed by poultry farmers.

It is moreover an object of the present invention to reduce the amount of feed wasted by livestock due to spillage.

It is yet another object of the present invention to effectively induce livestock to eat all or practically all of the various ingredients of feed provided for them.

It is still another object of the present invention to provide a method of feeding livestock whereby all ingredients of any particular feeding interval will be consumed so that no residual ingredients are left in the feed receptacle to be mixed with ingredients of a later feed interval, particularly where there is a change in the formula of the feed.

Other objects and advantages of the present invention will be apparent from the following description thereof taken in conjunction with the accompanying drawings.

BRIEF DESCRIPTION OF THE DRAWINGS

In the accompanying drawings in which two embodiments according to the present invention are illustrated.

DESCRIPTION OF PREFERRED EMBODIMENTS

Figure 1:
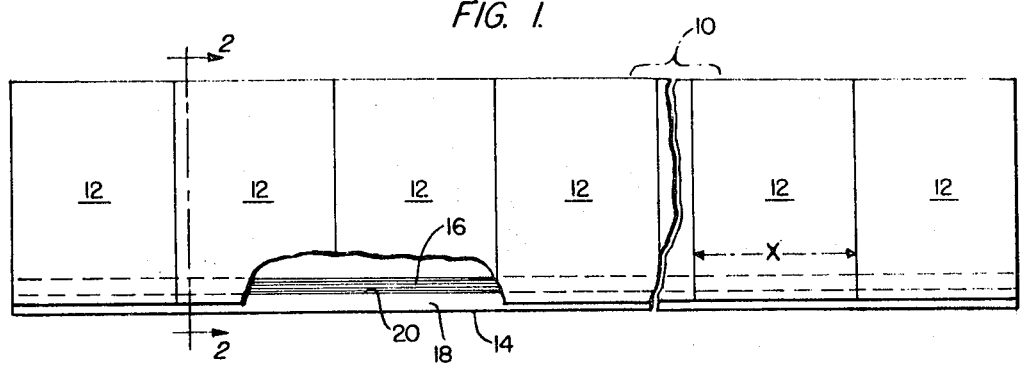
FIG. 1 is a plan view of cage and feed receptacle arrangement with which the method of the present invention may be carried out.
Figure 2:
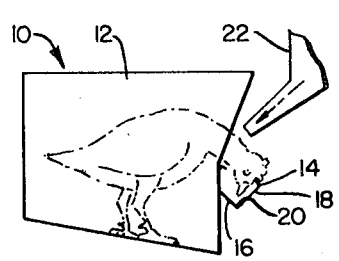
FIG. 2 is an elevational view in section taken along the line 2—2 in FIG. 1.

Referring now more particularly to the drawings, it is seen that the method or system of feeding livestock, in particular poultry, according to the present invention, may be carried out with a cage and feed receptacle arrangement 10 of FIGS. 1 and 2 in which the arrangement 10 includes two or more cage or like confinement units 12 and a feed receptacle 14 situated in the vicinity of the cage units 12 and accessible to the occupants of the cage units for feeding. For confinement of mature size poultry, each cage unit 12 should have a width X of about 15 inches with about five birds confined therein. The feed receptacle 14 should have inclined walls 16, 18 so that feed introduced therein will naturally gather at a distinct location such as at the intersection 20 of the inclined walls 16, 18. A feed dispensing member 22 is provided through which feed may be dispensed into feed receptacle 14.

With the cage and feed receptacle 10 described above in mind, the method or system of feeding livestock according to the present invention will now be considered. The cage and feed receptacle arrangement 10 is not essential to the method according to the present invention although it serves as one convenient means for carrying out the concept of the present invention, which basically relates to feeding livestock, poultry for example, many times a day and in very accurately measured uniform quantities during each feeding interval. Because of the many feed intervals involved in this method, the amount of feed dispensed during each feed interval necessarily would be small. Carrying out the concept of the present invention with the cage and feed receptacle 10 described above in connection with FIGS. 1 and 2, for example mature size birds are confined in each cage unit 12, each of which has a width of 15 inches along which a feed receptacle 14 extends. Feed is introduced into the feed receptacle 14 in very accurately measured uniform quantities at generally regular intervals for as many as about 4 to 20 times each day. For certain types of poultry of mature size feed may be introduced, for example, 16 times each day into the feed receptacle 14 at a rate of 1 ounce per 15 inches. After feed is introduced into the feed receptacle 14 for each five occupants of each cage unit 12 at each feeding a determination may be made as to whether the chickens are full fed, so that feed therefor may be supplied at an adjusted rate.

Once full feeding is established, feed for all groups may be reduced except for one group. For convenience, a mechanically driven hopper 22 may be moved along the length of the feed receptacle 14 and arranged so that 1 ounce of feed is dispensed into each 15 inches of feed receptacle. It is clear that individually measured 1 ounce packages of feed may be dispensed by hand into each 15 inches of feed receptacle 12 to carry out the concept of the present invention. After a determination is made that the occupants of a cage 12 are being full fed, that is they are eating all that they are able to, they may then be put on restricted feeding. Feed may be restricted either by reducing the measured quantity per feed interval or the number of feed intervals or combination thereof.

While the feed receptacle 14 is illustrated as being generally V-shaped, this is a matter of optimum convenience, as a generally flat bottom receptacle may be used instead. The V-shaped trough receptacle 12, however, allows feed in the small doses introduced thereinto to concentrate at the intersection 20 so that the occupants of cage units 12 will readily find the feed. By spreading out such minute quantities of feed as 1 ounce per 15 inches, each bird will tend to eat about the same amount as each of its cage mates as it will have little time to eat more than its cage mates. Also, because of the limited quantities birds will have neither the tendency to spill any feed nor the tendency to cull out any preferred ingredients. As a result, the birds' health is improved, since they will eat all ingredients and thereby derive the nutrients of the various ingredients to attain a balanced diet. Also, feed is not wasted by spillage. Further, as all feed is consumed at each feed interval because of the limited amount provided for the birds, a change in feed formula may be effected with little or no mixing of ingredients of prior or subsequent changes in formula.

It is further within the contemplation of this invention that one group of poultry may be full fed, that is, fed all the feed that can be eaten at each interval, and all other groups of poultry be subjected to limited or restricted feeding, that is permitted to eat from about 5 to 10 percent less than full feeding and in this way effect substantial feed savings without detriment to the health of the birds. Such a savings can be substantial when, for example, one group of birds is full fed while 90 percent of the birds are restricted in feeding, particularly in a commercial poultry house where 50 to 100,000 birds may be kept. In this connection, one group of birds for full feeding may be constituted by one cage unit 12 with the other cage units 12 being subjected to restricted feeding, that is less than full feeding.

Figure 4:
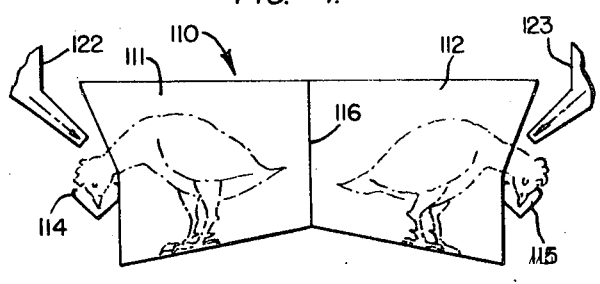
FIG. 4 is an elevational view in section taken along the line 4—4 of FIG. 3.
Figure 3:
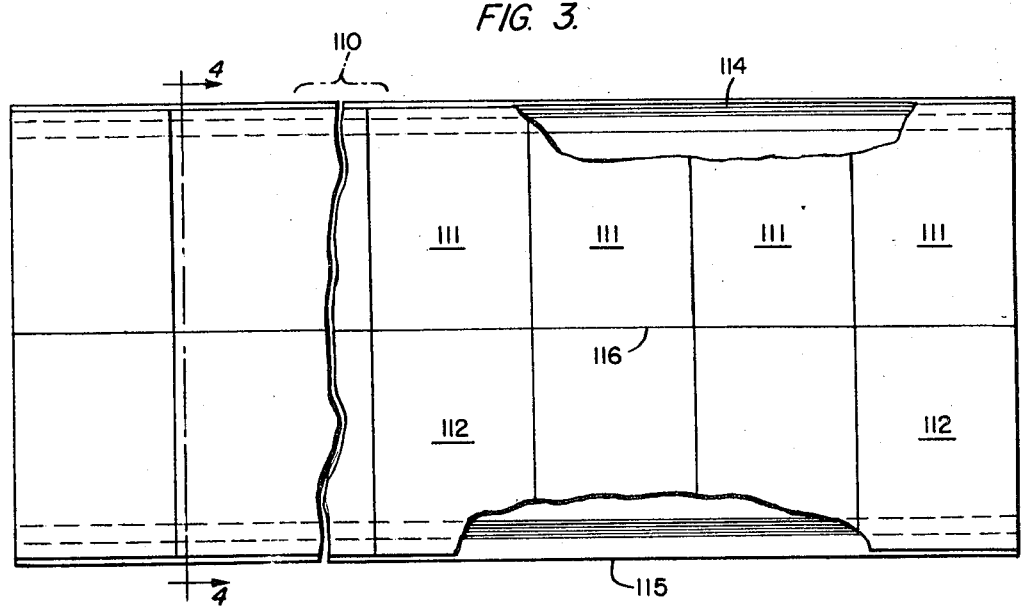
FIG. 3 is a plan view of an alternative cage and feed receptacle arrangement with which the method of the present invention may be carried out.

Considering controlled feeding on a large scale, FIGS. 3 and 4 show a cage and feed receptacle arrangement 110 wherein numerous such arrangements may be set up in a commercial poultry house. In the cage and feed receptacle arrangement 110 at least one cage row 111 is provided for full feeding from a feed dispensing hopper 122 at a rate of about 1 ounce per 15 inches and a cage row 112 secured to cage row 111 at a partition 116 and having a feed receptacle 115 disposed adjacent thereto for reception of feed from a dispensing hopper 123 dispensing feed at a rate less than dispensing hopper 122 by about 5 to 10 percent. Additional such cage rows may be provided in the poultry house with dispensing hoppers dispensing feed at the reduced rate of hopper 123.

Other arrangements for carrying out the present invention may take the form of a cylindrical cage arrangement and circular feed receptacle surrounding the cage arrangement. The specific cage arrangement is merely a variation in equipment and not essential to the concept of the proposed method or system.

In the case of baby chicks cage units 12 may be constructed with a dimension X of 30 inches with about 50 baby chicks in each cage unit and feed dispensed at about 1 ounce per 15 inches of cage for full feeding.

Consistent with the general concept of the present invention, the measurement of the quantities of feed to be dispensed may be carried out by weighing the feed to be dispensed. It is also within the contemplation of this invention that the quantities of feed dispensed into the feed receptacles 14 be accurately controlled by adjustable dispenser openings together with such dispensers moving with controlled speed over the feed receptacles 14.

It is to be understood that while only two cage and feed receptacle arrangements for carrying out the present invention have been illustrated and described in detail herein, numerous variations or modifications thereof may occur to those having skill in this art and what is intended to be covered herein is not only the method associated with the illustrated arrangement, but also any and all modified forms thereof as may come within the spirit and scope of the invention hereinabove disclosed.

What is claimed is:

1. Method of feeding poultry comprising the steps of:
   a. confining matured size poultry of about five birds in each group of two or more groups with each of said groups being in separate cage units having separate feed receptacles of which each feed receptacle has a width of about 15 inches accessible to feed the poultry;
   b. accurately measuring and dispensing feed at the rate of approximately 1 ounce per 15 inches of each of said feed receptacle in a first feed period;

c. repeating the step of accurately measuring and dispensing feed at the rate of approximaterly 1 ounce per 15 inches of each of said feed receptacle over from about three to 19 additional feed periods at generally regular intervals each day.

2. Feeding poultry according to claim 1, wherein said step of measuring and dispensing feed into the feed receptacle of one of said groups is up to as much feed as said one of said groups can eat over the course of a day divided by the number of feed intervals and measuring and dispensing from about 5 to 10 percent less feed than the amount dispensed into the feed receptacle of said one of said groups into each of the feed receptacles of the others of said groups in an equal number of feed intervals.

3. Feeding livestock according to claim 2, wherein said feeding step is carried out over 16 intervals each day.

4. Feeding livestock according to claim 3, wherein said step of measuring the quantity of feed is carried out by weighing.

5. Feeding livestock according to claim 3, wherein said step of measuring the quantity of feed is carried out and dispensed by moving a feed dispenser with an adjusted opening at a controlled speed over the feed receptacles for the poultry.

6. Method of feeding poultry comprising the steps of:
   a. confining baby chick size poultry of about 50 baby chick in each group of two or more groups with each of said groups being in separate cage units having separate feed receptacles of which each feed receptacle has a width of about 30 inches accessible to feed the poultry;
   b. accurately measuring and dispensing feed at the rate of approximately 1 ounce per 15 inches of each of said feed receptacle in a first feed period;
   c. repeating the step of accurately measuring and dispensing feed at the rate of approximately 1 ounce per 15 inches of each of said feed receptacle over from about three to 19 additional feed periods at generally regular intervals each day.

7. Feeding poultry according to claim 6, where said step of measuring and dispensing feed into the feed receptacle of one of said groups is up to as much as said one of said groups can eat over the course of a day divided by the number of feed intervals and measuring and dispensing from about 5 to 10 percent less feed than the amount dispensed into the feed receptacle of said one of said groups into each of the feed receptacles of the other of said groups in an equal number of feed intervals.

8. Feeding livestock according to claim 7, wherein said feeding step is carried out over 16 intervals each day.

9. Feeding livestock according to claim 8, wherein said step of measuring the quantity of feed is carried out by weighing.

10. Feeding livestock according to claim 8, wherein said step of measuring the quantity of feed is carried out and dispensed by moving a feed dispenser with an adjusted opening at a controlled speed over the feed receptacles for the poultry.

* * * * *